United States Patent
Rahman et al.

(10) Patent No.: US 11,223,559 B2
(45) Date of Patent: Jan. 11, 2022

(54) DETERMINING CONNECTIVITY BETWEEN COMPUTE NODES IN MULTI-HOP PATHS

(71) Applicant: Cisco Technology, Inc., San Jose, CA (US)

(72) Inventors: Reshad Rahman, Ottawa (CA); Carlos M. Pignataro, Cary, NC (US); Nagendra Kumar Nainar, Morrisville, NC (US); Eric Vyncke, Alleur (BE)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 16/566,680

(22) Filed: Sep. 10, 2019

(65) Prior Publication Data

US 2021/0075722 A1     Mar. 11, 2021

(51) Int. Cl.
*H04L 12/721*     (2013.01)
*H04L 12/46*      (2006.01)
*H04L 12/733*     (2013.01)
*H04L 12/707*     (2013.01)
*H04L 12/703*     (2013.01)
*H04L 12/749*     (2013.01)

(52) U.S. Cl.
CPC .......... *H04L 45/72* (2013.01); *H04L 12/4633* (2013.01); *H04L 45/20* (2013.01); *H04L 45/24* (2013.01); *H04L 45/28* (2013.01); *H04L 45/741* (2013.01)

(58) Field of Classification Search
None
See application file for complete search history.

(56) References Cited

U.S. PATENT DOCUMENTS

| 8,670,326 | B1 * | 3/2014 | Balasubramanian | ... H04L 45/22 370/238 |
| 2020/0084147 | A1 * | 3/2020 | Gandhi | ........... H04L 69/22 |
| 2021/0258347 | A1 * | 8/2021 | Batta | ............... H04L 43/12 |

* cited by examiner

*Primary Examiner* — Robert M Morlan
(74) *Attorney, Agent, or Firm* — Lee & Hayes, P.C.

(57) ABSTRACT

Techniques and mechanisms to enable a Bidirectional Forwarding Detection (BFD) Echo function to be used for IP multi-hop paths using IP encapsulation. A source device may encapsulate one or more BFD Echo packets as payloads in IP packets. The resulting IP packets may then be sent from a source device to a destination device over a multi-hop path such that one or more intermediary devices forward the IP packets onto the destination device. Upon receiving the IP packets, the destination device may echo back the one or more BFD Echo packets in the forwarding plane to indicate connectivity of the forwarding path between the devices. However, if the BFD Echo packets are not echoed back to the source device, the source device may determine that the multi-hop path has experienced a fault, and that traffic is to be rerouted through other paths.

20 Claims, 8 Drawing Sheets

```
GENERATING, AT A SOURCE DEVICE IN ONE OR MORE NETWORKS, A
BIDIRECTIONAL FORWARDING DETECTING (BFD) ECHO PACKET TO DETERMINE
CONNECTIVITY IN A PATH BETWEEN THE SOURCE DEVICE AND A DESTINATION
DEVICE DISPOSED IN THE ONE OR MORE NETWORKS
502
```

↓

```
ENCAPSULATING, AT THE SOURCE DEVICE, THE BFD ECHO PACKET IN A FIRST
INTERNET PROTOCOL (IP) PACKET, THE FIRST IP PACKET INDICATING A FIRST
SOURCE ADDRESS PORTION POPULATED WITH A FIRST ADDRESS ASSOCIATED
WITH THE SOURCE DEVICE, AND A FIRST DESTINATION ADDRESS PORTION
POPULATED WITH THE FIRST ADDRESS ASSOCIATED WITH THE SOURCE DEVICE
504
```

↓

```
ENCAPSULATING, AT THE SOURCE DEVICE, THE FIRST IP PACKET IN A SECOND IP
PACKET, THE SECOND IP PACKET INDICATING A SECOND SOURCE ADDRESS
PORTION POPULATED WITH THE FIRST ADDRESS ASSOCIATED WITH THE SOURCE
DEVICE, AND A SECOND DESTINATION ADDRESS PORTION POPULATED WITH A
SECOND ADDRESS ASSOCIATED WITH THE DESTINATION DEVICE
506
```

↓

```
SENDING, FROM THE SOURCE DEVICE, THE SECOND IP PACKET TO AN
INTERMEDIARY DEVICE THAT IS DISPOSED IN THE ONE OR MORE NETWORKS
BETWEEN THE SOURCE DEVICE AND THE DESTINATION DEVICE
508
```

DETERMINING CONNECTIVITY BETWEEN COMPUTE NODES IN MULTI-HOP PATHS

TECHNICAL FIELD

The present disclosure relates generally to performing continuity checks to detect faults between forwarding engines connected by a communication link in packet-forwarding networks.

BACKGROUND

In both enterprise and cloud service provider networks, the convergence of business-critical applications onto a common Internet Protocol (IP) infrastructure is becoming more common. Due to the criticality of the data, these networks are typically constructed with a high degree of redundancy. Although redundancy is desirable, the effectiveness of redundancy is dependent upon the ability of network nodes (or "network devices") to quickly detect faults or failures and reroute traffic to an alternative path. Thus, an increasing important feature of networking devices is the rapid detection of communication failures in order to more quickly establish alternative paths. This detection is often accomplished fairly quickly using data link hardware, such as Synchronous Optical Network (SONET) alarms. However, some media, such as Ethernet, do not provide this type of signaling, and some media may not detect certain kinds of failures in a network path, such as failing interfaces or forwarding engine components.

Often, networks use "Hello" mechanisms via routing protocols to detect failures where there is a lack of availability of hardware signaling. However, the failure detection times available in existing protocols are too slow for some applications and results in a great deal of lost data at high data rates. Further, routing protocol Hellos are useless when routing protocols are not in use, and the semantics of detection are different.

To address existing issues in failure detection in network paths, Bidirectional Forwarding Detection (BFD) is used to provide short-duration detection of failures in the path between adjacent forwarding engines, including the interfaces, data links, and even the forwarding engines themselves. Further, BFD provides a single mechanism that can be used for liveliness detection over any media, at any protocol layer, and with quick detection times. Further, BFD includes an Echo function where a stream of BFD Echo packets is transmitted from a source device such that a destination device in the path loops them back through the forwarding path to the source device for determining liveliness. While BFD is advantageous for various reasons, BFD suffers from some inefficiencies and has various limitations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for providing mechanisms to enable the BFD Echo function to be used for IP multi-hop paths using IP encapsulation. A method to perform techniques described herein includes generating a BFD Echo packet configured to detect a failure in a multi-hop path between a source device and a destination device. Further, the method includes encapsulating the BFD Echo packet in a first IP packet. The first IP packet may include a first source address portion populated with a first address associated with the source device, and further include a first destination address portion populated with the first address associated with the source device. The method may further include encapsulating the first IP packet in a second IP packet. The second IP packet may include a second source address portion populated with the first address associated with the source device, and further include a second destination address portion populated with a second address associated with the destination device.

After the first IP packet has been encapsulated in the second IP packet, the method may include the source device sending the second IP packet to an intermediary device that is disposed in the path between the source device and the destination device. Because the second destination address portion of the second IP packet is populated with the second address of the destination device, the intermediary device forwards the second IP packet comprising the BFD Echo packet onto the destination device.

Additionally, the techniques described herein may be performed by a system and/or device having non-transitory computer-readable media storing computer-executable instructions that, when executed by one or more processors, performs the method described above.

Example Embodiments

Generally, the Bidirectional Forwarding Detection protocol is designed to detect failures in communication with a forwarding plane next hop. The BFD protocol may be implemented in some component of the forwarding engine of a system such that the protocol is bound to the forwarding plane, and decoupled from the fate of the routing protocol engine. The BFD protocol operates on top of a data protocol (network layer, link layer, tunnels, etc.) that is forwarded between two systems and are carried as the payload of whatever encapsulating protocol is appropriate for the medium and network(s). The BFD protocol can provide failure detection on any kind of path between devices or systems, including physical links, virtual circuits, tunnels, multi-hop routed paths, etc.

In operation, the BFD protocol resembles a simple Hello protocol in which a pair of systems or devices transmit BFD packets periodically over each path between the two systems, and if a system stops receiving BFD packets for long enough, some component in that particular bidirectional path to the neighboring system is assumed to have failed. Upon detecting that a node in the forwarding path has failed, the systems or devices may attempt to find alternate routes through which to route traffic.

The BFD protocol further includes an Echo function that, when active, causes a stream of BFD Echo packets to be transmitted from a source device to a destination device in such a way that the stream of Echo packets is looped back to the source device through the forwarding path. If a number of Echo packets of the echoed data stream are not received at the source device, the session between the source and destination devices is declared to be down. The Echo function of BFD provides significant scaling and performance benefits at least because (i) the destination device sends the BFD Echo packets back in the forwarding plane such that there is no control-plane intervention, and (ii) there is less change of a false positive for detecting a fault due to the destination device's CPU being too busy handling a high-priority task rather than performing the BFD protocol As workloads (e.g., compute, storage, memory, network, etc.) continue to move towards virtual resources, such as virtual machines and containers, the need to perform connectivity detection increases to reroute traffic accordingly. For instance, a routing node (e.g., load balancer) would like to detect virtual resource failures rapidly to divert incoming traffic towards other virtual instances on different compute nodes. However, running the BFD protocol in a virtual environment on a continuous basis may not be a feasible approach as it consumes a large amount of processing resources.

As noted above, the BFD Echo function provides performance benefits due to no control-plane intervention. Due to these performance benefits, the BFD Echo function is useful for detecting liveliness in all bidirectional paths, and particularly for environments with resource constraints. However, the BFD Echo function also suffers from various issues or constraints. For instance, the Internet Engineering Task Force (IETF) has issued a Request for Comments (RFC) 5883 on "Bidirectional Forwarding Detection (BFD) for Multihop Paths" where the IETF notes various issues. Specifically, the IETF notes that the Echo function must not be used over multiple hops because intermediate hops would route the packets back to the sender, and connectivity through the entire path would not be possible to verify. Accordingly, various issues may arise when attempting to use the BFD Echo function for verifying connectivity between source/destination devices in multi-hop paths.

This disclosure describes techniques and mechanisms to enable the BFD Echo function to be used for IP multi-hop paths using IP encapsulation. According to the techniques and mechanisms described herein, one or more BFD Echo packets may be sent from a source device to a destination device over a multi-hop path such that one or more intermediary devices forward the BFD Echo packets onto the destination device. Upon receiving the one or more BFD Echo packets, the destination device may echo back the one or more BFD Echo packets in the forwarding plane to indicate connectivity of the forwarding path between the devices. However, if the BFD Echo packets are not echoed back to the source device, the source device may determine that the multi-hop path has failed, and that traffic is to be rerouted through other paths.

In some examples, the source device may initially generate one or more BFD Echo packets to determine connectivity, or detect a failure, in a multi-hop path between the source device and the destination device disposed in one or more networks. The source device may then encapsulate the BFD Echo packet in an inner protocol packet, such as an IP packet (e.g., IPv4, IPv6, etc.). The source device may set the source address of the inner IP packet to a source address of the source device, and may further set the destination address of the inner IP packet to the source address of the source device. In this way, if a receiving device were to receive the inner IP packet from the source device and analyze the inner IP packet, receiving device would loop the inner IP packet back to the source device because the destination address was set to the source address of the source device. In some examples, this technique may be used to determine connectivity in a single-hop path, such as between a source device and a neighboring, destination device.

In order to determine connectivity in a multi-hop path, the source device may further encapsulate the inner IP packet with an outer IP packet (e.g., IP-in-IP). The source device may set the source address of the outer IP packet to the source address of the source device, but may further set the destination address of the outer IP packet to a destination address of the destination device. The source device may then send this outer IP packet to an intermediary device in a multi-hop path of the source device and the destination device. The outer IP packet may encapsulate the inner IP packet and the BFD Echo packet as the payload.

As one or more intermediary devices in the multi-hop path receive the outer IP packet, each intermediary device may determine that the destination address of the outer IP packet is for the destination device, and continue forwarding the outer IP packet along the multi-hop path according to forwarding tables until the outer IP packet reaches the destination device. The destination device may determine that the outer IP packet was intended to reach it as its destination based on the destination address of the outer IP packet. Further, the destination device may analyze the inner IP packet and determine that the destination address of the inner IP packet is the source device. Thus, the destination device may determine to send the BFD Echo packet back to the source device to indicate liveliness of the multi-hop path between the source device and the destination device. In some examples, the techniques may be used for a single BFD Echo packet, or for a stream of BFD Echo packets that is looped between the source device and the destination device.

Using a single IP packet to encapsulate the BFD Echo packet where the single IP packet has source and destination addresses corresponding to the source device, only single-hop connectivity may be established as the neighboring device that receives the IP packet would loop the packet immediately back to the source device. While this is helpful for determining single-hop liveliness, the techniques described herein extend the BFD Echo function to multi-hop liveliness detection by using IP-in-IP where the outer IP packet indicates a destination address of an ultimate destination device in the multi-hop path.

In some examples, additional techniques may be utilized besides IP-in-IP for certain protocols. For instance, IPv6 packets may include an extension header in which a destination option may be defined that enables the BFD Echo function for IP multi-hop paths. For example, a destination option may be defined in an extension header of an IPv6 packet such that a destination address of the destination device may be placed in the extension header so intermediary devices forward the IPv6 packet along to the destination device. The IPv6 packet may include a BFD Echo packet as a payload, and using the destination option of an extension header, enable the BFD Echo function to determine liveliness for multi-hop paths. The source address indicated in the header of the IPv6 packet may indicate the source address of the source device, and the destination device may then loop back the BFD Echo packet to the source device.

Although the techniques described herein are primarily with reference IP packets (e.g., IPv4, IPv6, etc.), the techniques are generally applicable to any type of protocol, implemented at any layer, that may be used to encapsulate a BFD packet or BFD Echo packet (e.g., IPsec, UDP, TCP, etc.). Similarly, the techniques may be applied to determine liveliness for multi-hop paths between hardware devices, virtual resources (e.g., virtual machines, containers, etc.) running on devices, and/or any combination thereof. While the techniques are described with reference to BFD Echo packets, the techniques are equally applicable to any type of packets used to determine liveliness or other information about a multi-hop path, such as latency/trip time through the multi-hop path. The techniques described herein improve upon previous techniques by enabling BFD Echo function for IP multi-hop paths, among other improvements and advantages.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
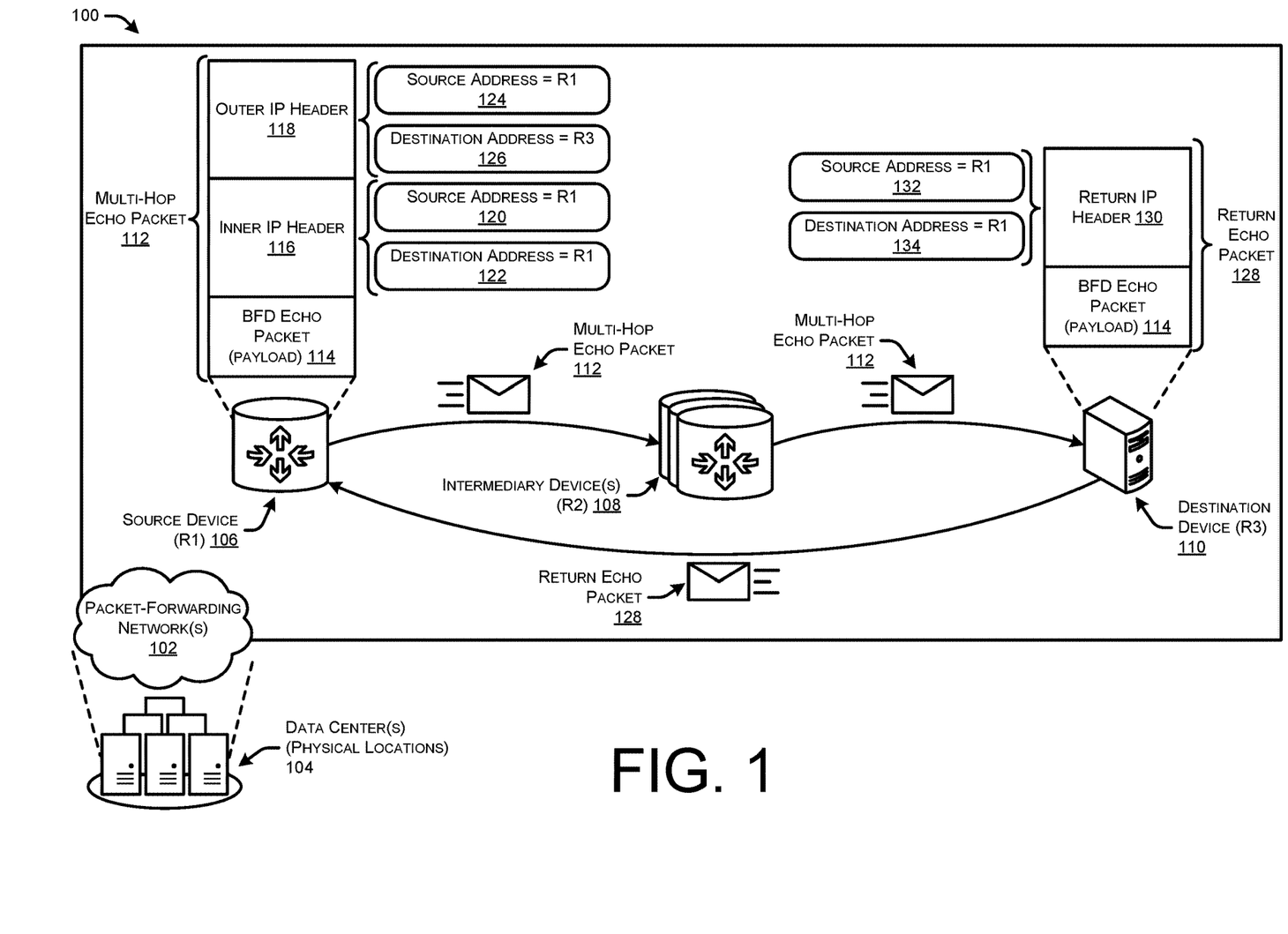
FIG. 1 illustrates a system-architecture diagram of an example packet-forwarding network in which a source device generates a multi-hop Echo packet that is forwarded by intermediary devices onto a destination device, and the destination device then loops back the BFD Echo packet to the source device for liveliness detection.

FIG. 1 illustrates a system-architecture diagram of an example environment 100 that includes one or more packet-forwarding networks 102 that may include devices housed or located in one or more data centers 104. The packet-forwarding networks 102 may include one or more networks implemented by any viable communication technology, such as wired and/or wireless modalities and/or technologies. The packet-forwarding networks 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The packet-forwarding networks 102 may include devices, virtual resources, or other nodes that relay packets from one network segment to another by nodes in the computer network. The packet-forwarding networks 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of the packet-forwarding networks 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The packet-forwarding networks 102 may include any type of networking device, such as servers, switches, routers, hubs, bridges, gateways, modems, repeaters, access points, etc. As illustrated, the packet-forwarding networks 102 may include a source device (R1) 102, one or more intermediate devices R2) 108, and a destination device (R3) 110. These devices 106-110 may comprise any type of networking device capable of forwarding packets in the packet-forwarding networks 102. As illustrated, the source device 106, intermediary device(s) 102, and destination device 110 may define a multi-hop path in the packet-forwarding networks 102.

In some instances, the source device 106 may desire to determine a liveliness or connectivity of the multi-hop path with the destination device 10 for purposes of routing traffic to the destination device 110. For instance, the source device 106 may want to ensure that there is connectivity with the destination device 110 over the multi-hop path such that traffic may be routed to the destination device 110 that is received at the source device 106. In such examples, the source device may establish a BFD session with the destination device 110 to, for example, track IPv4 and/or IPv6 connectivity between the source device 106 and the destination device 110. The source device 106 may establish a session by encapsulating BFD packets in IP packets.

Once a BFD session is established, the source device 106 may desire to activate the BFD Echo function to stream BFD Echo packets in such a way as to have the destination device 110 loop them back through the forwarding path to determine liveliness of the forwarding plane on the multi-hop path. However, encapsulating one or more BFD Echo packets using a single IP packet may result in a first neighboring device looping back the Echo packet immediately, thereby only detecting liveliness for a single-hop path.

The source device 106 may initially generate one or more BFD Echo packets 114 to determine connectivity, or detect a failure, in the multi-hop path between the source device 106 and the destination device 110 disposed in the packet-forwarding network(s) 102. The source device 106 may then encapsulate the BFD Echo packet 114 in an inner protocol packet, such as an inner IP packet (e.g., IPv4, IPv6, etc.) that has an inner IP header 116. The source device 106 may set the source address 120 of the inner IP header 116 to a source address (e.g., "R1") of the source device 106, and may further set the destination address 122 of the inner IP header 116 to the source address (e.g., "R1") of the source device 106. In this way, if a receiving device were to receive a packet with the inner IP header 116 from the source device 106 and analyze the inner IP header 116, receiving device would loop the IP packet back to the source device 106 because the destination address 122 was set to the source address "R1" of the source device 106. In some examples, this technique may be used to determine connectivity in a single-hop path, such as between the source device 106 and a neighboring device.

In order to determine connectivity in the multi-hop path, the source device 106 may further encapsulate the inner IP packet with an outer IP packet (e.g., IP-in-IP) having an outer IP header 118. The source device 106 may set the source address 124 of the outer IP header 118 to the source address "R1" of the source device 106, but may further set the destination address 126 of the outer IP header 118 to a destination address "R3" of the destination device 110. The source device 106 may then send the generated multi-hop echo packet 112 to an intermediary device 108 in the multi-hop path of the source device 106 and the destination device 110. The outer IP packet may encapsulate the inner IP packet and the BFD Echo packet 114 as the payload.

As the one or more intermediary devices 108 in the multi-hop path receive the multi-hop echo packet 112, each intermediary device 108 may determine that the destination address 126 of the outer IP header 118 is for the destination device 110, and continue forwarding the multi-hop echo packet 112 along the multi-hop path according to forwarding tables until the multi-hop echo packet 112 reaches the destination device 110. The destination device 110 may determine that the multi-hop echo packet 112 was intended to reach it as its destination based on the destination address 126 "R3" of the outer IP header 118. Further, the destination device 110 may analyze the inner IP header 116 and determine that the destination address 122 of the inner IP header 116 corresponds to the source device 106. Thus, the destination device 110 may determine to send the BFD Echo packet 114 back to the source device 106 in a return echo packet 128 to indicate liveliness of the multi-hop path between the source device 106 and the destination device 110. In some examples, the techniques may be used for a single BFD Echo packet 114, or for a stream of BFD Echo packets 114 that is looped between the source device 106 and the destination device 110.

However, in some examples a device on the multi-hop path (or a virtual resource), or a link, may experience a failure or other issue that prevents the multi-hop echo packet 112 from being forwarded onto the destination device 110 and disrupt the BFD session. In such examples, if the source device 106 does not receive an echoed return echo packet 128 within a threshold period of time, the source device 106 may determine that there is no longer connectivity on the multi-hop path, and to reroute traffic on a different path rather than using the multi-hop path to the destination device 110.

To implement the techniques described herein, the source device 106 may be configured to perform the IP-in-IP encapsulation to generate the multi-hop echo packet 112. Similarly, the destination device 110 may be configured with logic to determine that the outer IP header 118 indicates the destination address 126 for the packet, and the inner IP header 116 indicates that the BFD Echo packet 114 is to be looped back to the source device 106 based on the destination address 122 of the inner IP header 116.

Although illustrated as physical devices, in some examples, the source device 106, intermediary devices 108, and/or the destination device 110 may comprise virtual resources or virtual nodes in the packet-forwarding network 102.

Figure 2:
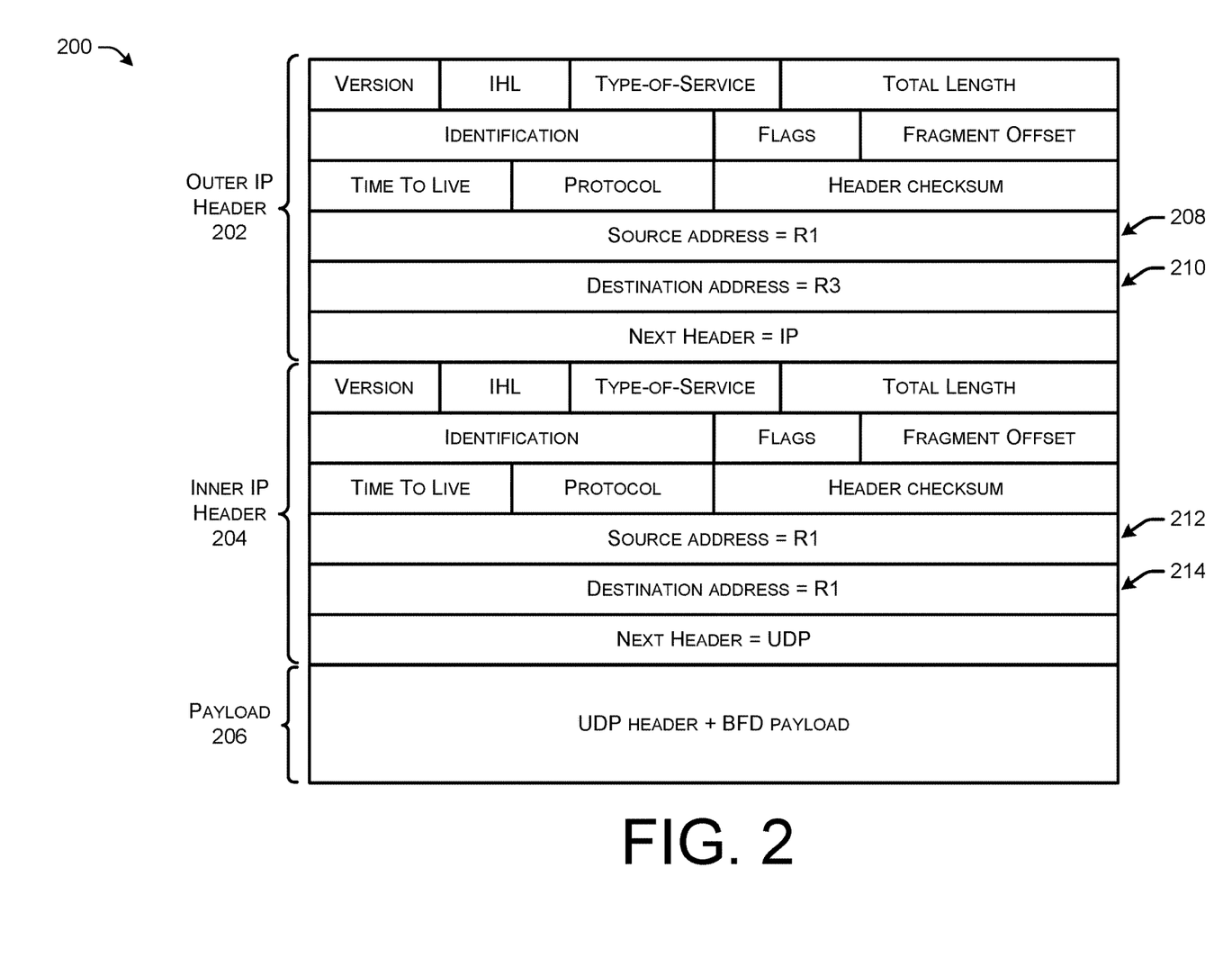
FIG. 2 illustrates an example of a BFD Echo packet that is encapsulated as a payload of an inner IP packet, and the inner IP packet is then encapsulated in an outer IP packet for transmission along a multi-hop path for liveliness detection.

FIG. 2 illustrates an example of a multi-hop echo packet 200 (e.g., multi-hop echo packet 112) that is encapsulated as a payload of an inner IP packet, and the inner IP packet is then encapsulated in an outer IP packet for transmission along a multi-hop path for liveliness detection.

As illustrated the multi-hop echo packet 200 has an outer IP header 202 encapsulating an inn IP header 204, which is in turn encapsulating the ultimate payload 206 that includes a UDP header and the BFD payload (e.g., BFD Echo packet 114). As illustrated, the inner IP header includes various fields according to the communication protocol being used to transmit the multi-hop echo packet 200 (e.g., IPv4). The inner IP header 204 may include a source address 212 that indicates an address "R1" corresponding to the source device 106 that generates the multi-hop echo packet 200. Further, the inner IP header 204 may include a destination address 214 that is populated or designated as the address "R1" corresponding to the source device 106.

The outer IP header 202 may include various fields according to the communication protocol being used to transmit the multi-hop echo packet 200 (e.g., IPv4). The outer IP header 202 may include a source address 208 that indicates an address "R1" corresponding to the source device 106 that generates the multi-hop echo packet 200. Further, the outer IP header 202 may include a destination address 210 that is populated or designated as the address "R3" corresponding to the destination device 110. In this way, the outer IP header 202 may result in the multi-hop echo packet 200 being forwarded along the multi-hop path by intermediary devices 108 to reach the destination device 110.

The different addresses described herein may comprise any type of address, such as IP addresses, MAC addresses, and/or other addresses. The addresses may be assigned to the devices themselves (e.g., source device 106, destination device 110, intermediary device 108, etc.), or be addresses that are assigned to virtual resources (e.g., virtual machines, containers, etc.) running on devices. Thus, the nodes in the network, such as the source node or destination node, may be virtual resources or processes.

Figure 3:
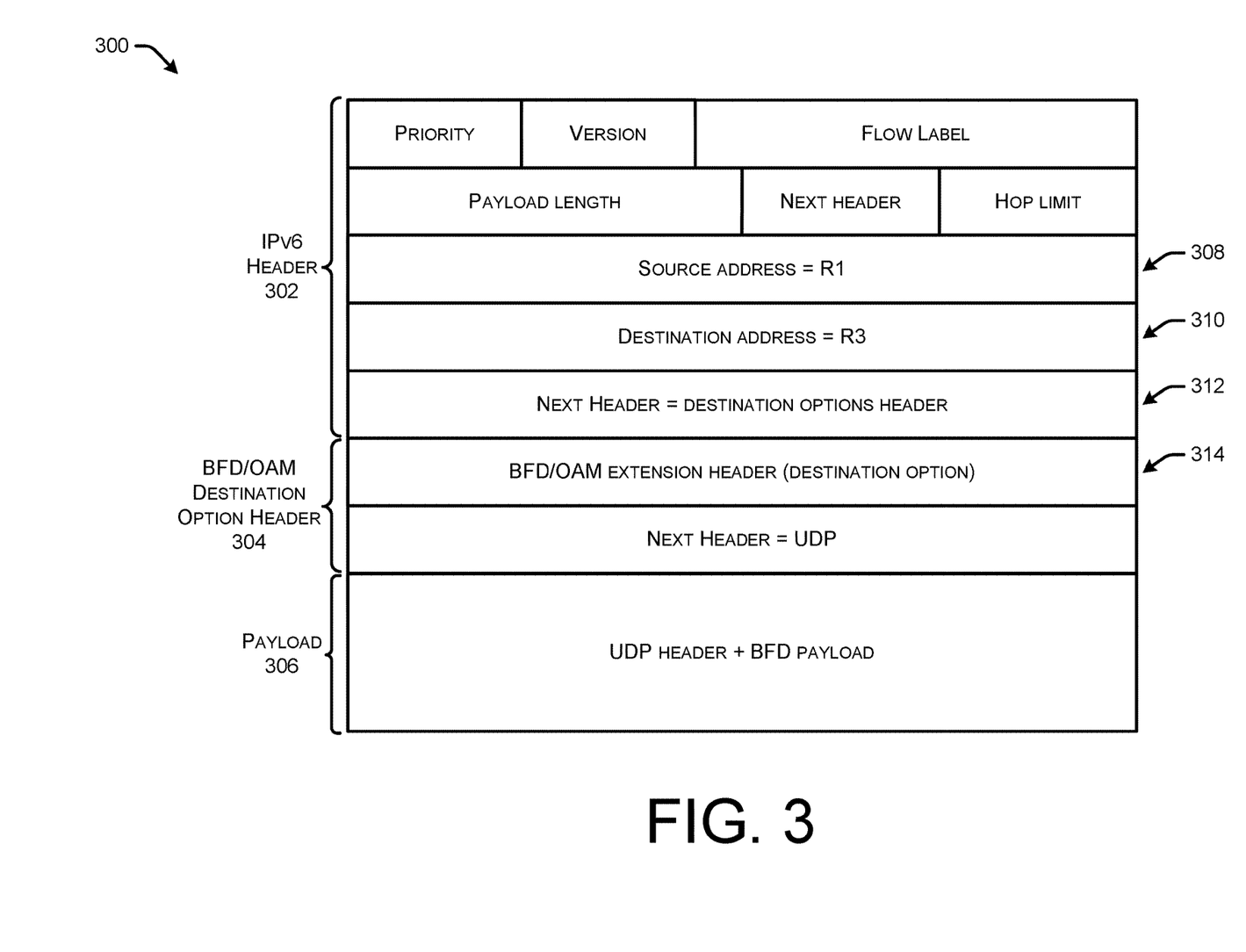
FIG. 3 illustrates an example of an IPv6 packet that includes an extension header with a destination option designating a destination device on a multi-hop path for liveliness detection.

FIG. 3 illustrates an example of an IPv6 packet 300 that includes an extension header with a destination option designating a destination device on a multi-hop path for liveliness detection. As illustrated, the IPv6 packet 300 may include an IPv6 header 302, a BFD destination option header 304, and a payload 306.

The IPv6 header 302 may comprise a source address field 308 populated with a source address of the source device 106. The IPv6 header 302 may further include a destination address field 310 populated with an address "R3" of the destination device 110 (or destination virtual resource). The IPv6 header 302 may also include a next header destination options header 312 that triggers a change in the IPv6 header such that when the IPv6 packet 300 is processed at the destination device 110, the IPv6 packet 300 is looped back to the source device 106. The BFD destination option header 304 includes the BFD extension header (destination option) 314. Further, the payload 306 includes the UDP header as well as the BFD payload (e.g., BFD Echo packet 114).

According to the techniques described herein, the destination option 314 allows the IPv6 packet 300 to be looped-back at the destination device 110. The destination option 314 triggers a change in the IPv6 header such that, when the IPv6 packet 300 is processed at the destination device 110, the IPv6 packet 300 is looped back to the source device 106 for liveliness detection using BFD Echo function for multi-hop paths.

Figure 4:
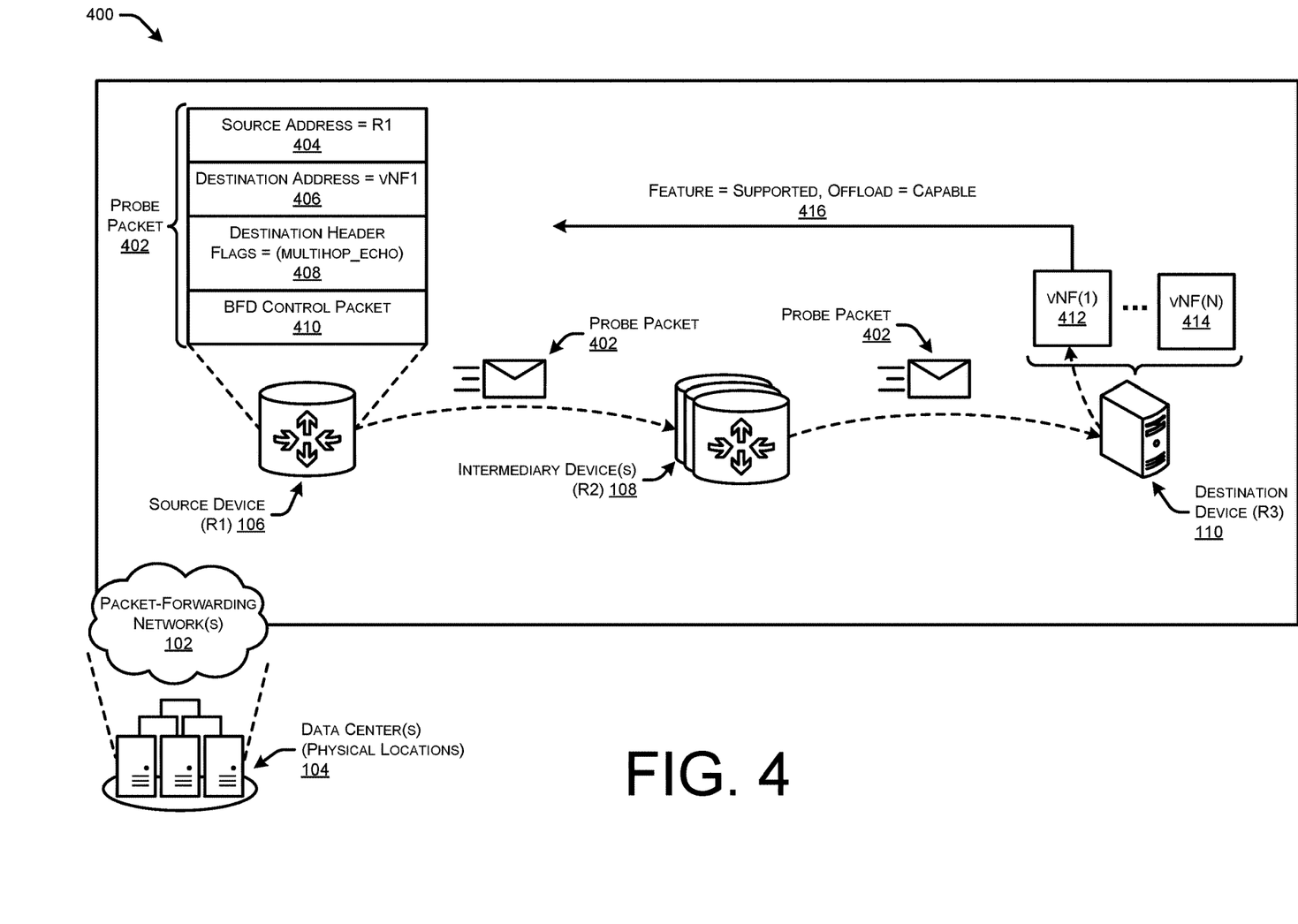
FIG. 4 illustrates a system-architecture diagram of an example packet-forwarding network in which a virtual resource on a destination device in a multi-hop path indicates that a BFD Echo function is supported, and hardware offloading is available.

FIG. 4 illustrates a system-architecture diagram 400 of an example packet-forwarding network 102 in which a virtual resource on a destination device in a multi-hop path indicates that a BFD Echo function is supported, and hardware offloading is available.

To analyze the IPv6 packet 300, additional forwarding semantics may need to be supported by the receiving device (e.g., destination device 110). For instance, the receiving node needs to understand to rewrite the destination header and forward it back to the source device 106, and that may need to occur in the data plane. Further, the source device 106 may need to identify if the destination device 110 has any hardware capability to determine a rate at which it can forward the BFD Echo packets, and use that to determine the rate at which to send BFD Echo packets to the destination device 110.

As illustrated, the source device 106 may generate one or more probe packets 402 to perform various functions. For instance, the probe packet(s) 402 may be utilized by the source device 106 to determine (i) if the remote node supports the multi-hop mode for BFD Echo function, and/or (ii) if the remote node has hardware offload capability options for processing BFD Echo packets. The probe packet 402 may comprise include a source address portion 404 that designates an address "R1" which may be the address of the source device 106. Further, the probe packet 402 may include a destination address portion that designates an address "vNF1" indicating that the destination of the probe packet is a virtual network function (1) running on the destination device 110. The probe packet 402 may additionally include one or more destination header flags 408 that indicate the probe packet 402 is to determine whether the destination device 110 and/or vNF(1) 214 supports the multi-hop Echo mode function. Additionally, the probe packet 402 may include a portion/field (e.g., payload) including a BFD control packet 410.

The source device 106 may send the probe packet 402 to an intermediary device 108 such that the probe packet 402 is forwarded onto the destination device 110. The destination device 110 may identify the destination header flags 408 and punt the probe packet 402 to the appropriate virtual network function (vNF1) 412. The virtual network functions 412-414 may comprise any type of virtual process, such as a virtual machine, container, process, program, etc. The vNF(1) 412 may receive the probe packet 402, and will reply back to the source device 106 with relevant details.

In examples where the vNF(1) 412 does not support the BFD Echo feature for multi-hop paths, the vNF(1) 412 will reply back with an error message (e.g., ICMPv6 error message). In such examples, the source device 106 will not continue with the BFD Echo packet session with the destination device.

However, if the vNF(1) 412 does support the BFD Echo feature for multi-hop paths, the vNF(1) 412 will reply back with a response 416 indicating that the BFD Echo feature is supported for multi-hop paths, and may further indicate that hardware offload capability is available for the BFD Echo packet session. For instance, smart NICs may be capable of offloading data plane and control plane activities (e.g., powered by ARM processor running Linux distribution). In such an environment, the presence of such offload capability can be signaled back to the source device 106 using one or more responses 416 during negotiation of the BFD Echo packet session. The source device 106 can determine the rate at which is can send the probe 402 based on the presence of the hardware offload capability, or not to send it at all. For instance, is a smart NIC can offload the responsibility of "Process and Forward" destination option, then the source device 106 can send at a higher rate.

Figure 5:
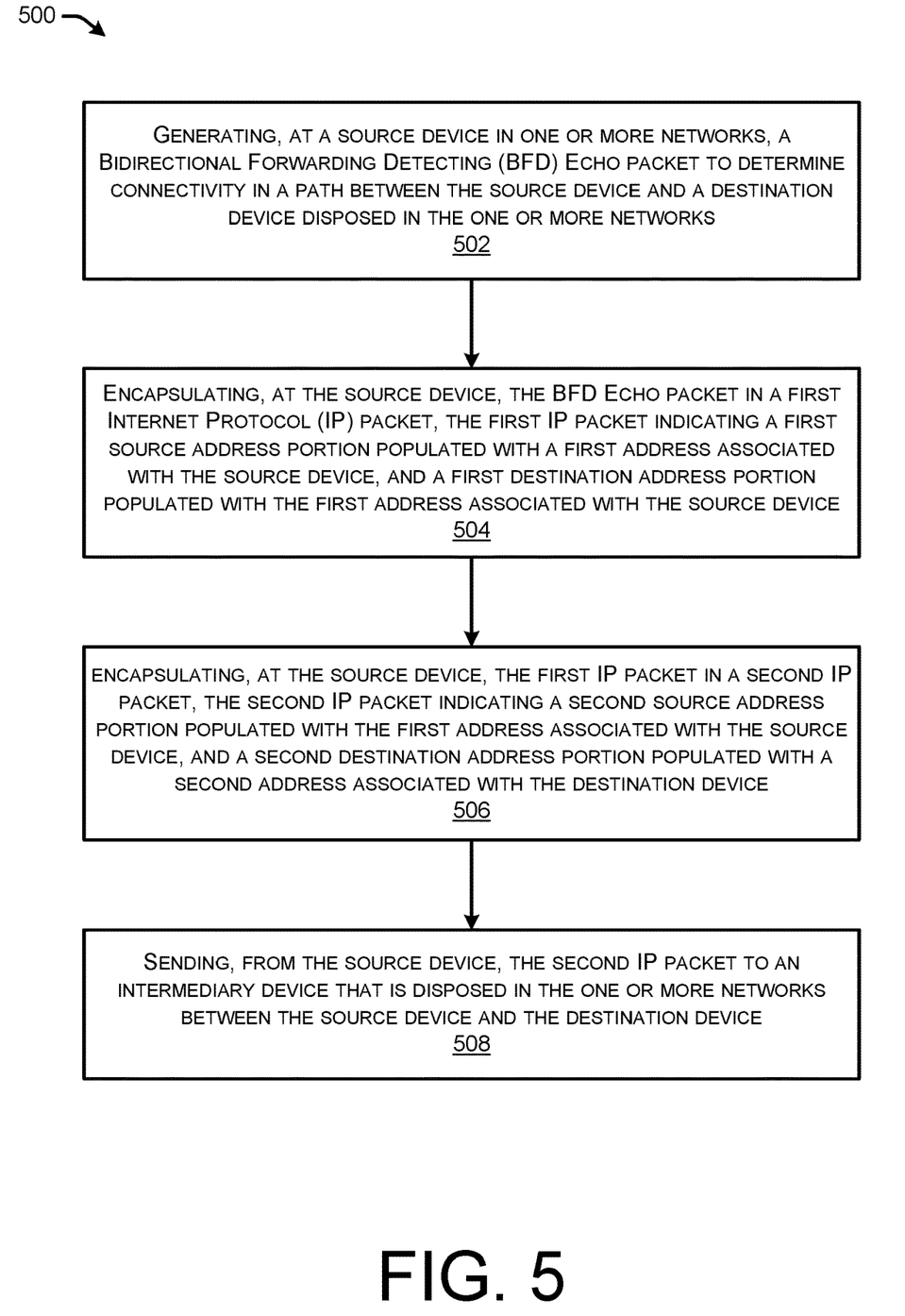
FIG. 5 illustrates a flow diagram of an example method for generating and sending an IP packet that enables the BFD Echo function to be used for multi-hop paths in a packet-forwarding network.
Figure 6:
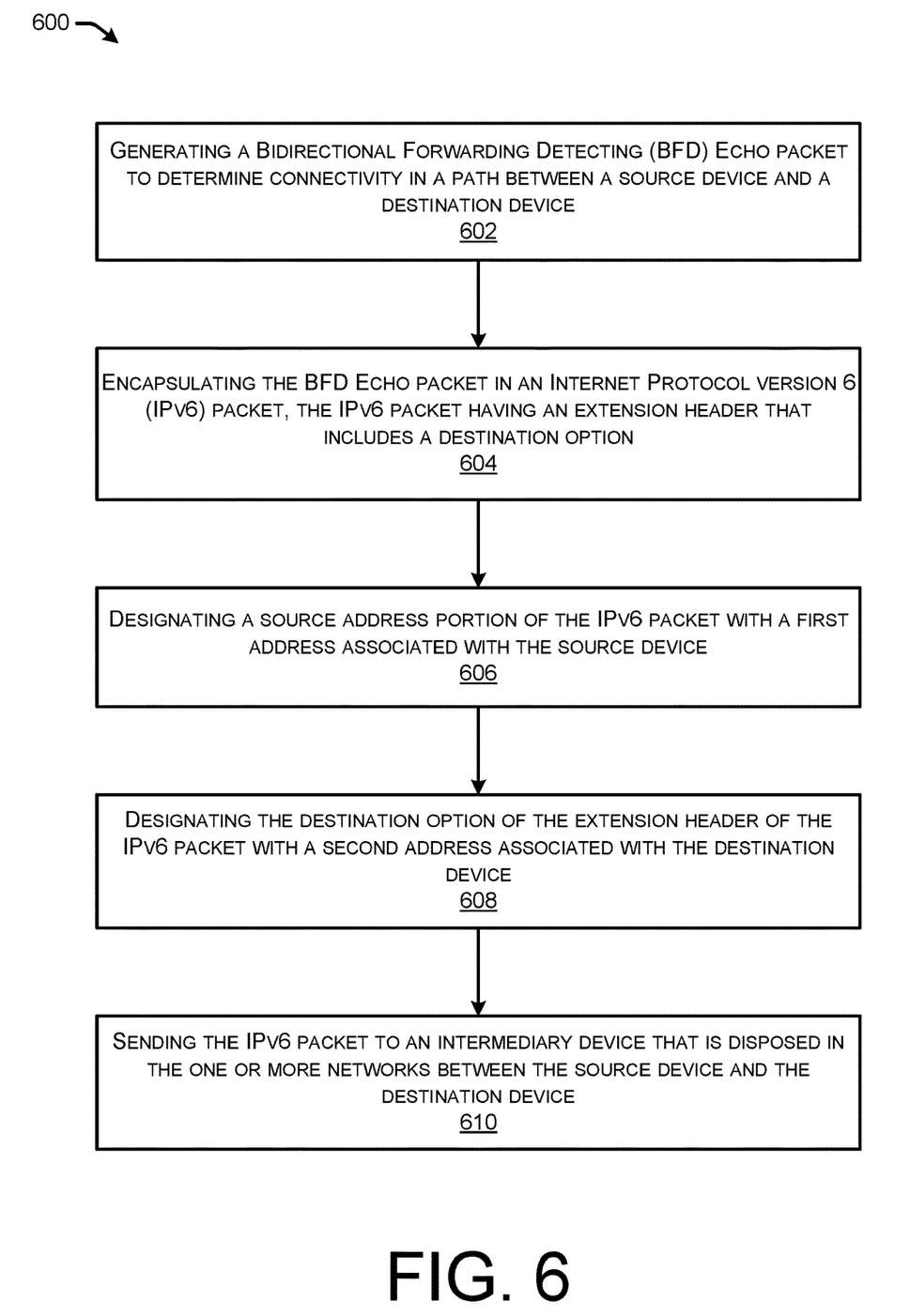
FIG. 6 illustrates a flow diagram of an example method for generating and sending an IP packet that includes an extension header with a destination option to enable the BFD Echo function to be used for multi-hop paths in a packet-forwarding network.

FIGS. 5 and 6 illustrate flow diagrams of example methods 500 and 600 that illustrate aspects of the functions performed at least partly by the devices in the packet-forwarding networks 102 as described in FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for generating and sending an IP packet that enables the BFD Echo function to be used for multi-hop paths in a packet-forwarding network. In some examples, the method 500 may be performed, at least in part, by a source device 106 that comprises one or more processors and one or more non-transitory computer-readable media storing computer-executable instructions that, when executed by the one or more processors, cause the one or more processors to perform the steps of method 500.

At 502, the source device 106 may generate a Bidirectional Forwarding Detecting (BFD) Echo packet (e.g., BFD Echo packet 114) to determine connectivity in a path between the source device 106 and a destination device 110.

At 504, the source device 106 may encapsulate the BFD Echo packet in a first Internet Protocol (IP) packet. The first IP packet may include a header (e.g., inner IP header 116) that includes a first source address portion populated with a first address associated with the source device, and a first destination address portion populated with the first address associated with the source device.

At 506, the source device 106 may encapsulate the first IP packet in a second IP packet. The second IP packet may include an outer IP header 118 that includes a second source address portion populated with the first address associated with the source device, and a second destination address portion populated with a second address associated with the destination device. Generally, the source address and destination address may comprise any type of address usable to indicate a device, virtual resource, node, etc., to which the second IP packet is intended for receipt.

At 508, the source device 106 may send the second IP packet (e.g., multi-hop echo packet 112) to an intermediary device 108 that is disposed in a network (e.g., packet-forwarding network(s) 102) between the source device 106 and the destination device 110.

In some examples, the source device 106 may further receive the BFD Echo packet from the intermediary device, and verify connectivity on the path between the source device and the destination device based at least in part on receiving the BFD Echo packet. Further, the source device 106 may further determine that the BFD Echo packet was not returned on the path from the destination device within a threshold period of time, and determine that there is a failure in the path between the source device and the destination device based at least in part on the BFD Echo packet not being returned within the threshold period of time.

In some examples, the destination address corresponds to a virtual computing resource executing on the destination device. Alternatively, the destination address may correspond to the destination device 110 itself.

In examples, the BFD Echo packet may comprise a first BFD Echo packet in a stream of BFD Echo packets that is sent according to a BFD Echo function. Further, the path may comprises a multi hop path, and the first IP packet and the second IP packets are each IPv4 packets (and/or IPv6 packets).

FIG. 6 illustrates a flow diagram of an example method 600 for generating and sending an IP packet that includes an extension header with a destination option to enable the BFD Echo function to be used for multi-hop paths in a packet-forwarding network.

At 602, a source device 106 that is disposed in one or more networks may generate a Bidirectional Forwarding Detecting (BFD) Echo packet to determine connectivity in a path between the source device and a destination device.

At 604, the source device 106 may encapsulate the BFD Echo packet in an Internet Protocol version 6 (IPv6) packet, the IPv6 packet having an extension header that includes a destination option.

At 606, the source device 106 may designate a source address portion of the IPv6 packet with a first address associated with the source device.

At 608, the source device 106 may designate the destination option of the extension header of the IPv6 packet with a second address associated with the destination device.

At 610, the source device 106 may send the IPv6 packet to an intermediary device that is disposed in the one or more networks between the source device and the destination device.

In some examples, the source device 106 may further receive the BFD Echo packet from the intermediary device, and verify connectivity on the path between the source device and the destination device based at least in part on receiving the BFD Echo packet.

Further, in examples the source device 106 may determine that the BFD Echo packet was not returned on the path from the destination device within a threshold period of time (e.g., threshold time specific by a protocol, threshold time determine based on expected return due to latency, etc.), and determine that there is a failure in the path between the source device and the destination device based at least in part on the BFD Echo packet not being returned within the threshold period of time.

In some examples, the source device 106 may generate a probe IPv6 packet having a respective extension header that includes a respective destination option, populate the respective destination option with an indication of a request that the destination device indicate that it supports the respective destination option of the probe IPv6 packet, and receive response data sent from the destination device indicating that the destination device supports the respective destination option of the probe IPv6 packet.

Further, the source device 106 may generate a probe IPv6 packet having a respective extension header that includes a respective destination option, populate the respective destination option with an indication of a request that the destination device indicate hardware offload capabilities for processing the IPv6 packet, and receive response data sent from the destination device indicating the hardware offload capabilities of the destination device for processing of the IPv6 packet.

Figure 7:
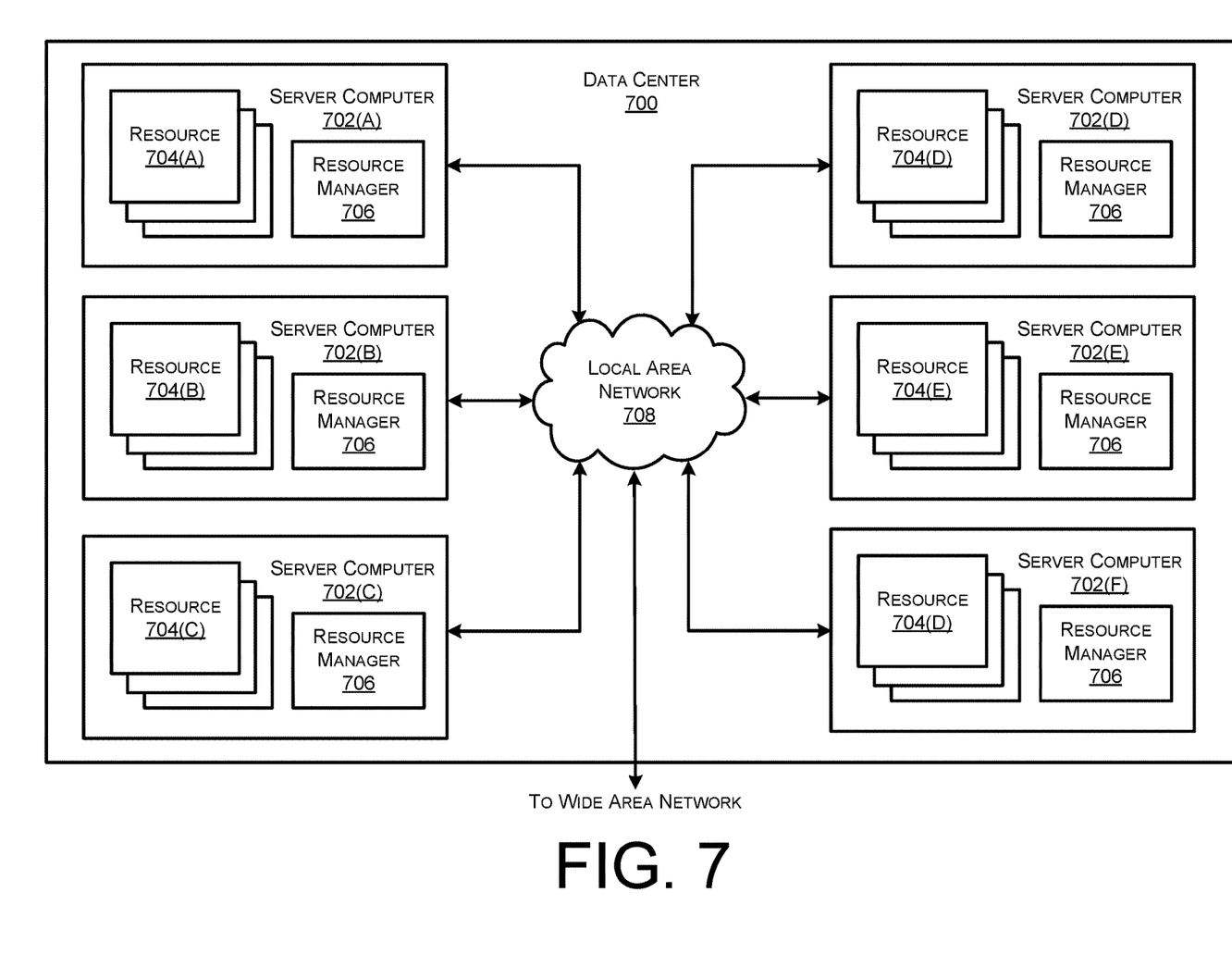
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein, such as one or more of the source device 106, intermediary device 108, and/or destination device 110. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein. For instance, the containers and/or virtual machines may serve as nodes in the packet-forwarding network 102.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
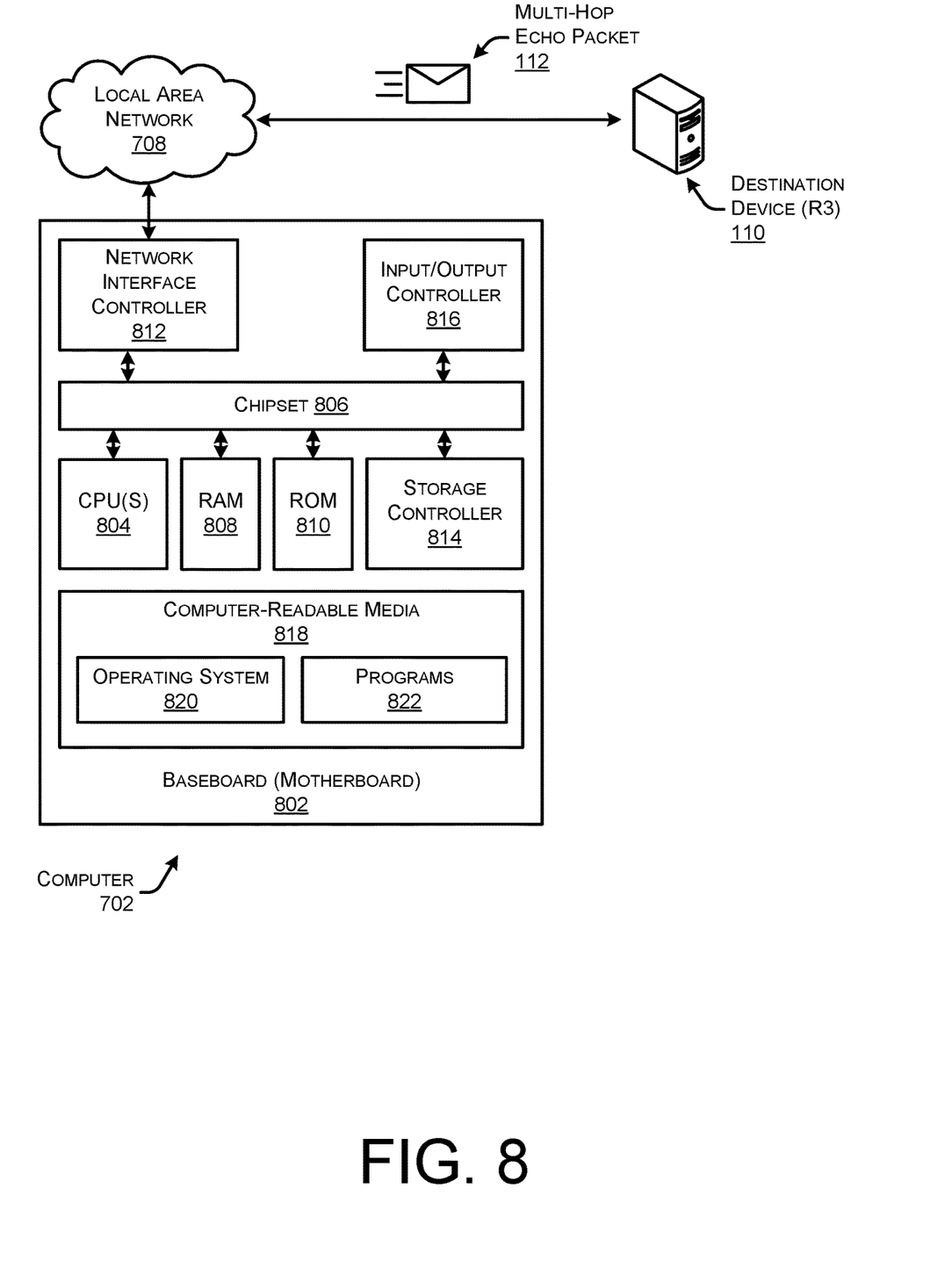
FIG. 8 is a computer architecture diagram showing an illustrative computer hardware architecture for implementing a server device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server 106 described herein, and may comprise networked devices such as servers, switches, routers, hubs, bridges, gateways, modems, repeaters, access points, etc.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708 (and/or 102). It should be appreciated that multiple NICs 812 can be present in the computer 702, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device

818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702. In some examples, the operations performed by the network 102, and or any components included therein, may be supported by one or more devices similar to computer 702. Stated otherwise, some or all of the operations performed by the network 102, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more of a source device 106, an intermediary device 108, and/or a destination device 110. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by the source device 106, intermediary device 108, and destination device 110. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for determining connectivity in multi-hop paths using BFD Echo packet(s). For instance, the programs 822 may cause the computer 702 to perform techniques for communicating with other devices using any type of protocol or standard usable for determining connectivity. Additionally, the programs 822 may comprise instructions that cause the computer 702 to perform the specific techniques for enabling multi-hop connectivity determination.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A source device comprising:
   one or more processors; and
   one or more non-transitory computer-readable media storing computer-executable instructions that, when executed by the one or more processors, cause the one or more processors to:
   generate a Bidirectional Forwarding Detecting (BFD) Echo packet to determine connectivity in a path between the source device and a destination device;
   encapsulate the BFD Echo packet in a first Internet Protocol (IP) packet, the first IP packet including:
   a first source address portion populated with a first address associated with the source device; and
   a first destination address portion populated with the first address associated with the source device;

encapsulate the first IP packet in a second IP packet, the
second IP packet including:
a second source address portion populated with the
first address associated with the source device; and
a second destination address portion populated with
a second address associated with the destination
device; and
send the second IP packet to an intermediary device
that is disposed in a network between the source
device and the destination device.

2. The source device of claim 1, comprising further computer-executable instructions that, when executed by the one or more processors, cause the one or more processors to:
receive the BFD Echo packet from the intermediary device; and
verify connectivity on the path between the source device and the destination device based at least in part on receiving the BFD Echo packet.

3. The source device of claim 1, comprising further computer-executable instructions that, when executed by the one or more processors, cause the one or more processors to:
determine that the BFD Echo packet was not returned on the path from the destination device within a threshold period of time; and
determine that there is a failure in the path between the source device and the destination device based at least in part on the BFD Echo packet not being returned within the threshold period of time.

4. The source device of claim 1, wherein the destination address corresponds to a virtual computing resource executing on the destination device.

5. The source device of claim 1, wherein the destination address corresponds to the destination device.

6. The source device of claim 1, wherein the BFD Echo packet comprises a first BFD Echo packet in a stream of BFD Echo packets that is sent according to a BFD Echo function.

7. The source device of claim 1, wherein:
the path comprises a multi hop path; and
the first IP packet and the second IP packet are each IPv4 packets.

8. A method comprising:
generating, at a source device in one or more networks, a Bidirectional Forwarding Detecting (BFD) Echo packet to determine connectivity in a path between the source device and a destination device disposed in the one or more networks;
encapsulating, at the source device, the BFD Echo packet in a first Internet Protocol (IP) packet, the first IP packet including:
a first source address portion populated with a first address associated with the source device; and
a first destination address portion populated with the first address associated with the source device;
encapsulating, at the source device, the first IP packet in a second IP packet, the second IP packet including:
a second source address portion populated with the first address associated with the source device; and
a second destination address portion populated with a second address associated with the destination device; and
sending, from the source device, the second IP packet to an intermediary device that is disposed in the one or more networks between the source device and the destination device.

9. The method of claim 8, further comprising:
receiving, at the source device, the BFD Echo packet from the intermediary device; and
verifying connectivity on the path between the source device and the destination device based at least in part on receiving the BFD Echo packet.

10. The method of claim 8, further comprising:
determining that the BFD Echo packet was not returned on the path from the destination device within a threshold period of time; and
determining that there is a failure in the path between the source device and the destination device based at least in part on the BFD Echo packet not being returned within the threshold period of time.

11. The method of claim 8, wherein the destination address corresponds to a virtual computing resource executing on the destination device.

12. The method of claim 8, wherein the destination address corresponds to the destination device.

13. The method of claim 8, wherein the BFD Echo packet comprises a first BFD Echo packet in a stream of BFD Echo packets that is sent according to a BFD Echo function.

14. The method of claim 8, wherein:
the path between the source device and the destination device comprises a multi hop path; and
the first IP packet and the second IP packet are each IPv4 packets.

15. A source device disposed in one or more networks, the source device comprising:
one or more processors; and
one or more non-transitory computer-readable media storing computer-executable instructions that, when executed by the one or more processors, cause the one or more processors to:
generate a Bidirectional Forwarding Detecting (BFD) Echo packet to determine connectivity in a path between the source device and a destination device;
encapsulate the BFD Echo packet in an Internet Protocol version 6 (IPv6) packet, the IPv6 packet having an extension header that includes a destination option;
designate a source address portion of the IPv6 packet with a first address associated with the source device;
designate the destination option of the extension header of the IPv6 packet with a second address associated with the destination device; and
send the IPv6 packet to an intermediary device that is disposed in the one or more networks between the source device and the destination device.

16. The source device of claim 15, comprising further computer-executable instructions that, when executed by the one or more processors, cause the one or more processors to:
receive the BFD Echo packet from the intermediary device; and
verify connectivity on the path between the source device and the destination device based at least in part on receiving the BFD Echo packet.

17. The source device of claim 15, comprising further computer-executable instructions that, when executed by the one or more processors, cause the one or more processors to:
determine that the BFD Echo packet was not returned on the path from the destination device within a threshold period of time; and
determine that there is a failure in the path between the source device and the destination device based at least in part on the BFD Echo packet not being returned within the threshold period of time.

18. The source device of claim 15, comprising further computer-executable instructions that, when executed by the one or more processors, cause the one or more processors to:
- generate a probe IPv6 packet having a respective extension header that includes a respective destination option;
- populate the respective destination option with an indication of a request that the destination device indicate that it supports the respective destination option of the probe IPv6 packet; and
- receive response data sent from the destination device indicating that the destination device supports the respective destination option of the probe IPv6 packet.

19. The source device of claim 15, comprising further computer-executable instructions that, when executed by the one or more processors, cause the one or more processors to:
- generate a probe IPv6 packet having a respective extension header that includes a respective destination option;
- populate the respective destination option with an indication of a request that the destination device indicate hardware offload capabilities for processing the IPv6 packet; and
- receive response data sent from the destination device indicating the hardware offload capabilities of the destination device for processing of the IPv6 packet.

20. The source device of claim 15, wherein the destination address corresponds to a virtual computing resource executing on the destination device.

* * * * *